US011049127B2

(12) United States Patent
    Drake

(10) Patent No.: US 11,049,127 B2
(45) Date of Patent: Jun. 29, 2021

(54) CONSUMER APPLIANCES AND METHODS FOR INCENTIVIZED MEDIA PRESENTATION

(71) Applicant: Haier US Appliance Solutions, Inc., Wilmington, DE (US)

(72) Inventor: Jeff Donald Drake, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 156 days.

(21) Appl. No.: 16/238,681

(22) Filed: Jan. 3, 2019

(65) Prior Publication Data
    US 2020/0219121 A1    Jul. 9, 2020

(51) Int. Cl.
    *G06Q 30/02* (2012.01)
    *G06Q 20/10* (2012.01)

(52) U.S. Cl.
    CPC ......... *G06Q 30/0211* (2013.01); *G06Q 20/10* (2013.01); *G06Q 30/0257* (2013.01); *G06Q 30/0277* (2013.01)

(58) Field of Classification Search
    CPC ........... G06Q 30/0211; G06Q 30/0257; G06Q 30/0277; G06Q 20/10
    See application file for complete search history.

(56) References Cited

U.S. PATENT DOCUMENTS

| 2002/0120502 A1* | 8/2002 | Sakaguchi | H04L 29/06 705/14.49 |
|---|---|---|---|
| 2006/0277568 A1 | 12/2006 | Kim | |
| 2017/0221021 A1 | 8/2017 | Gazetov | |
| 2017/0248925 A1* | 8/2017 | Root | H04W 4/70 |
| 2019/0109713 A1* | 4/2019 | Clark | H04L 9/3239 |

OTHER PUBLICATIONS

Sam Towen, Blockchain Advertising Is Coming. Fast. Very Fast, Crypto Briefing, https://cryptobriefing.com/blockchain-advertising-coming-fast/ Feb. 26, 2018, 9.
CryptosisTeam, IOTW ICO Review—Taking Blockchain to Every Home Appliance, https://cryptosis.io/iotw-ico-review/, Jul. 3, 2018, 21.

* cited by examiner

*Primary Examiner* — Azam A Ansari
(74) *Attorney, Agent, or Firm* — Dority & Manning, P.A.

(57) ABSTRACT

Consumer appliances and methods for their use are generally provided herein. A method may include receiving an incentivized media file, and presenting the incentivized media file on a consumer appliance. The method may also include generating a discrete block of a blockchain in response to presenting the incentivized media file, and transmitting the discrete block to a blockchain network wirelessly connected to the consumer appliance.

6 Claims, 3 Drawing Sheets

CONSUMER APPLIANCES AND METHODS FOR INCENTIVIZED MEDIA PRESENTATION

FIELD OF THE INVENTION

The present subject matter relates generally to appliances and methods for tracking and compensating users for watching or listening to incentivized media files, such as advertisements.

BACKGROUND OF THE INVENTION

Modern consumer appliances, such as refrigerator appliances, often include one or more features for communicating with a user. For example, an electronic display or loudspeaker may be included with a consumer appliance in order to show or play programmed alerts, instructional text, conditions within the appliance, etc.

In some instances, it might be useful or desirable to have a consumer appliance to present or play a media file (e.g., an advertisement) from the communication features of the consumer appliance. However, consumers often have very little incentive or desire to allow such media files to be played, for example, within a home or residential space. In order to overcome this, it may be advantageous to provide an incentive or reward for a user who allows certain media files to be played on their own consumer appliances. Nonetheless, it can be difficult to accurately track or measure which consumer appliances or users wish to participate in such arrangements. In particular, it can be difficult to know or accurately determine if or when an incentivized media file has actually been played at a particular appliance. This lack of accuracy may be especially troublesome if a user wishes to be compensated for watching or listening to a specific media file.

As a result, it may be useful to provide an appliance or method that could accurately and readily account for occasions in which an incentivized media file been presented or play at a particular consumer appliance.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating consumer appliance is provided. The method may include receiving an incentivized media file, and presenting the incentivized media file on a consumer appliance. The method may also include generating a discrete block of a blockchain in response to presenting the incentivized media file, and transmitting the discrete block to a blockchain network wirelessly connected to the consumer appliance.

In another exemplary aspect of the present disclosure, a method of operating a consumer appliance is provided. The method may include receiving an incentivized media file from a remote server in wireless communication with a consumer appliance, and presenting the incentivized media file on the consumer appliance. The method may also include generating a discrete block of a blockchain in response to presenting the incentivized media file, and transmitting the discrete block to a blockchain network wirelessly connected to the consumer appliance. The blockchain network may include a plurality of consumer appliances organized in peer-to-peer communication.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
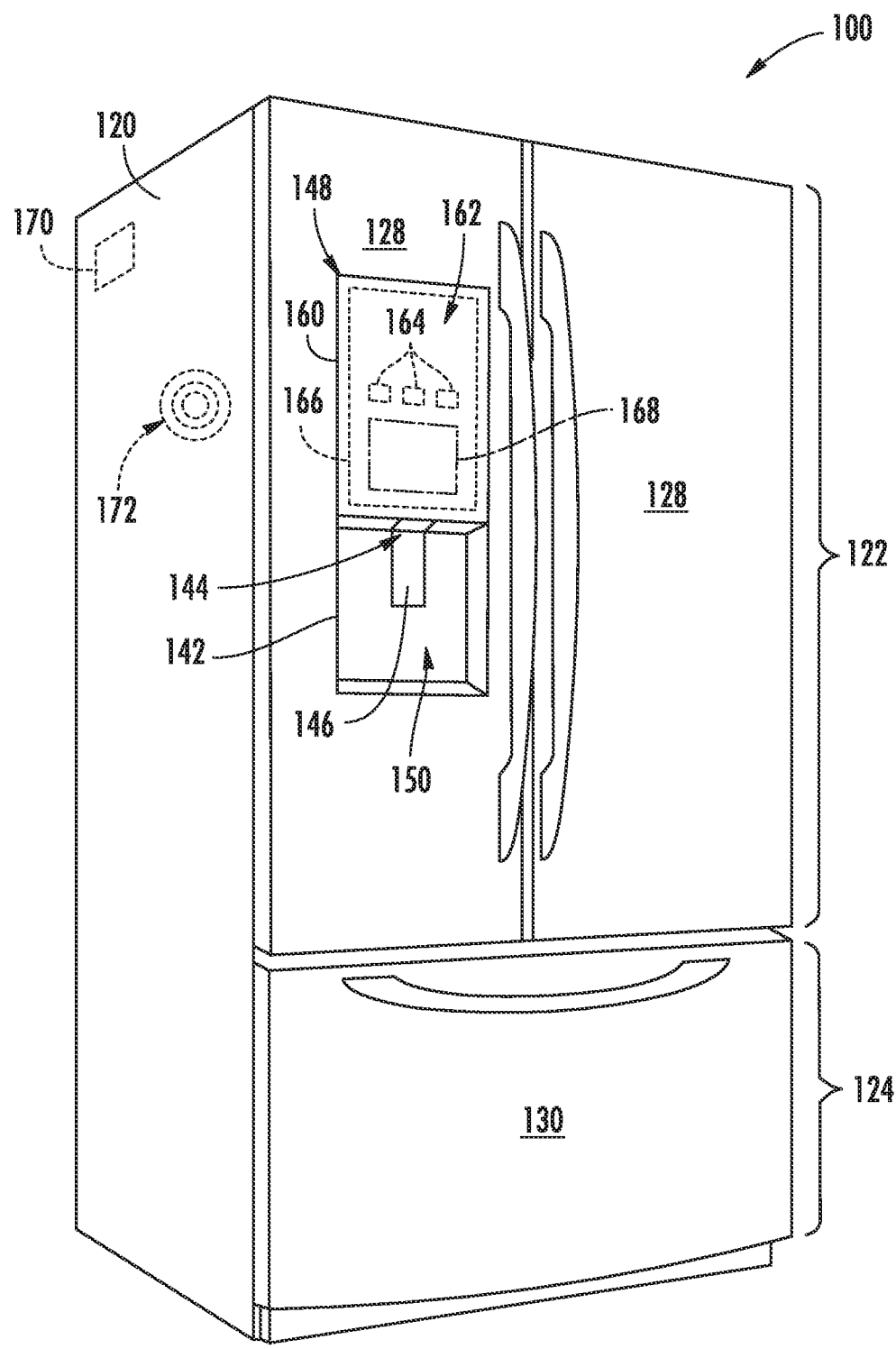
FIG. 1 provides a perspective view of a consumer appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Within the present disclosure, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Turning now to the figures, FIG. 1 illustrates a consumer appliance 100 according to exemplary embodiments of the present disclosure. Generally, consumer appliance 100 includes a cabinet 102 on which one or more communications features (e.g., an image monitor 160 or a loudspeaker 172) are mounted. In the exemplary embodiments of FIG. 1, consumer appliance is provided as a refrigerator appliance 100. However, as would be understood, consumer appliance 100 may be provided as any suitable consumer appliance (e.g., a microwave, oven appliance, cooktop appliance, range hood, dishwasher appliance, washing machine appliance, dryer appliance, etc.).

As generally illustrated in FIG. 1, refrigerator appliance 100 includes a housing or cabinet 120 that defines chilled chambers for receipt of food items for storage. In particular, cabinet 120 defines a fresh food chamber 122 positioned at or adjacent the top of cabinet 120 and a freezer chamber 124 arranged at or adjacent the bottom of cabinet 120. As such, refrigerator appliance 100 is generally referred to as a bottom mount refrigerator. It is recognized, however, any other suitable appliance or refrigerator style, such as, for example, a top mount refrigerator appliance, a side-by-side style refrigerator appliance, etc. may be provided. Consequently, the description set forth herein is for illustrative purposes only and is not intended to be limiting in any aspect to any particular refrigerator chamber configuration or, as noted above, any particular style of appliance.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is attached to a freezer drawer (not shown) slidably mounted within freezer chamber 124. Refrigerator doors 128 and freezer door 130 are shown in the closed configuration in FIG. 1.

In some embodiments, refrigerator appliance 100 also includes a dispensing assembly 140 for dispensing liquid water or ice. Dispensing assembly 140 includes a dispenser 142 positioned on or mounted to an exterior portion of refrigerator appliance 100 (e.g., on one of refrigerator doors 128). Dispenser 142 includes a discharging outlet 144 for accessing ice and liquid water. An actuating mechanism 146, shown as a paddle, is mounted below discharging outlet 144 for operating dispenser 142. In alternative exemplary embodiments, any suitable actuating mechanism may be used to operate dispenser 142. For example, dispenser 142 can include a sensor (such as an ultrasonic sensor) or a button rather than the paddle.

Discharging outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open refrigerator doors 128.

As shown, a user interface 148 is provided for user engagement (e.g., input or output) with refrigerator appliance 100. For example, user interface 148 may generally provide for controlling the mode of operation or communicating information about appliance operation. Any suitable type of user input 164 (e.g., buttons, switches, touchscreens, etc.) may be provided to initiate or direct operation of the refrigerator appliance 100.

In certain embodiments, user interface 148 includes an image monitor 160, which may be any suitable type of mechanism for visually presenting a digital (e.g., interactive) image. For example, image monitor 160 may be a liquid crystal display (LCD), a plasma display panel (PDP), a cathode ray tube (CRT) display, etc. Thus, image monitor 160 includes a display surface 162 (e.g., screen or display panel) at which the digital image is presented or displayed as an optically-viewable picture (e.g., static image or dynamic video) to a user. The optically-viewable picture may correspond to any suitable signal or data received or stored by refrigerator appliance 100 (e.g., at controller 170). As an example, image monitor 160 may present incentivized media file of a visual advertisement in the form of viewable text, images, or video. Optionally, the visual advertisement may be limited to a predetermined subportion area 168 that is less than the total viewable area 166 defined on the display surface 162. As an additional or alternative example, image monitor 160 may present a graphical user interface (GUI) that allows a user to select or manipulate various operational features of refrigerator appliance 100. During use of such GUI embodiments, a user may engage, select, or adjust the image presented at image monitor 160 through any suitable input, such as gesture controls detected through a camera assembly, voice controls detected through one or more microphones, associated touch panels (e.g., capacitance or resistance touch panel) or sensors overlaid across the display surface 162, etc.

In additional or alternative embodiments, refrigerator appliance 100 includes one or more loudspeakers 172, which may be any suitable type of mechanism for projecting or generating an audible sound wave. For example, a loudspeaker 172 may be provided as a dynamic loudspeaker, piezoelectric speaker, electrostatic speaker, etc. Thus, the loudspeaker 172 may generally project an analog or digital signal as one or more audible sound waves to be heard by a user. The audible sound waves may correspond to any suitable signal or data received or stored by refrigerator appliance 100 (e.g., at controller 170). As an example, loudspeakers 172 may present incentivized media file in the form of an audible message (e.g., in coordination with an optically viewable image at the image monitor 160 or, alternatively, in isolation and without any accompanying image).

Operation of the refrigerator appliance 100 can be generally controlled or regulated by a controller 170 that is operably coupled to user interface 148 and other components of refrigerator appliance 100. In some embodiments, user interface 148 provides selections for user manipulation of the operation of refrigerator appliance 100. As an example, user interface 148 may provide for selections between whole or crushed ice, chilled water, or specific modes of operation, including one or more modes in which incentivized media files, such as advertisements, are permitted for presentation at the user interface 148. In response to one or more input signals (e.g., from local input sensors, user manipulation of user interface 148, or remote signals transmitted by a remote server 220), controller 170 may operate various components of the refrigerator appliance 100. For example, controller 170 may receive a remote signal from a remote server 220 (FIG. 2) that includes an incentivized media file. Upon receiving such a signal, controller 170 may direct image monitor 160 or loudspeaker 172 to present the incentivized media file.

Figure 2:
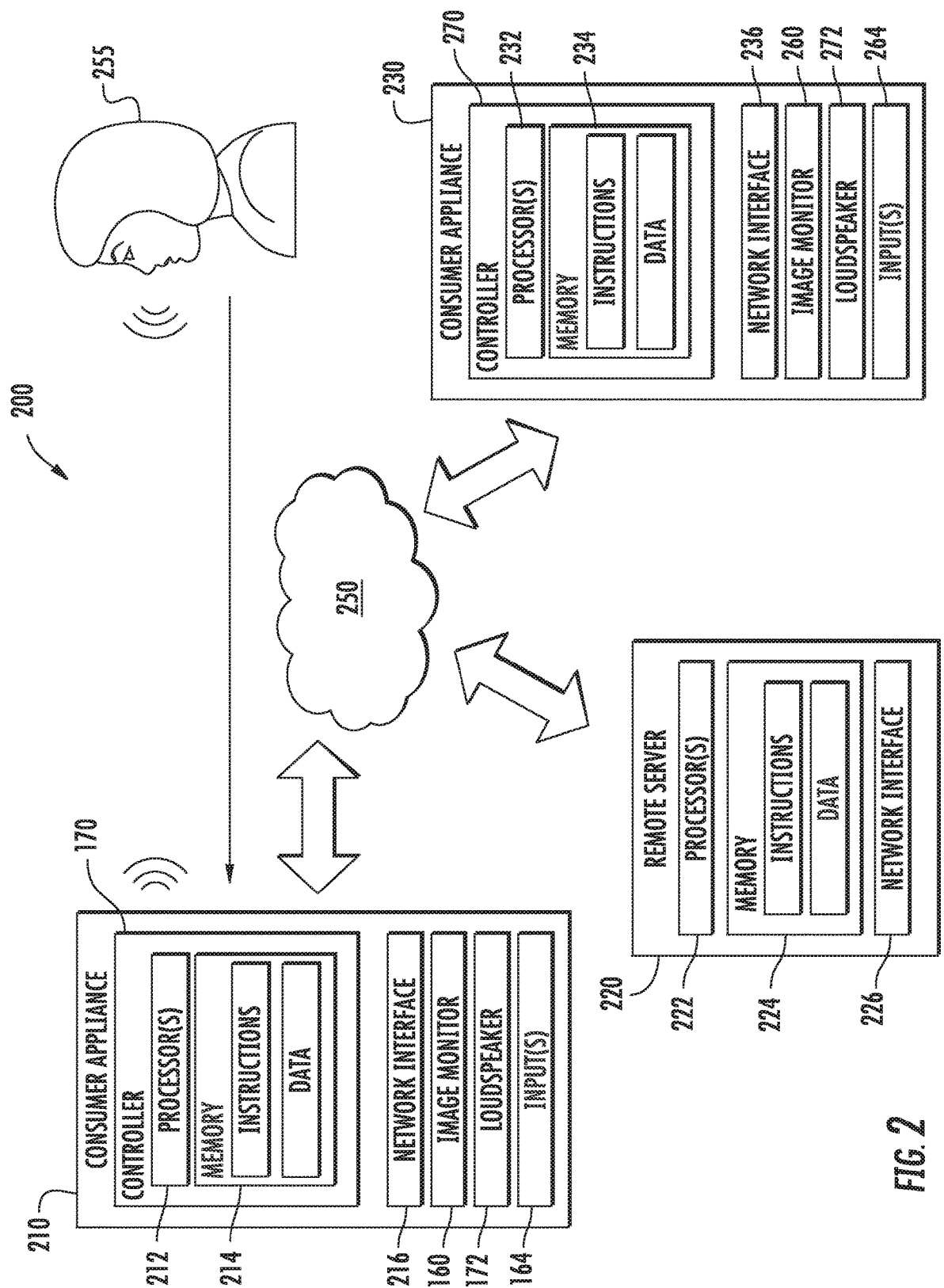
FIG. 2 provides a schematic view of a networked system according to exemplary embodiments of the present disclosure.

Turning now to FIG. 2, a schematic view of a networked system 200, including a primary consumer appliance 210 (e.g., refrigerator appliance 100—FIG. 1, or any other suitable appliance, as described above), one or more secondary consumer appliances 230, and a remote server 220. As shown, primary consumer appliance 210 can be communicatively coupled with network 250 and various other nodes, such as a remote server 220 and one or more secondary consumer appliances 230. Moreover, one or more users 255 can be in operative communication with primary consumer appliance 210 via various methods (e.g., voice control, gesture recognition, or engagement with one or more user inputs 164).

As noted above, a primary consumer appliance 210 (e.g., refrigerator appliance 100—FIG. 1) may include a controller 170 operably coupled to one or more user inputs 164, image monitor 160, or loudspeaker 172. Controller 170 may include one or more processors 212 and one or more memory devices 214 (i.e., memory). The one or more processors 212 can be any suitable processing device (e.g., a processor core, a microprocessor, an ASIC, a FPGA, a microcontroller, etc.) and can be one processor or a plurality of processors that are operatively connected. The memory device 214 can include one or more non-transitory computer-readable storage mediums, such as RAM, ROM, EEPROM, EPROM, flash memory devices, magnetic disks, etc., and combinations thereof. The memory devices 214 can store data and instructions that are executed by the processor 212 to cause the primary consumer appliance 210 to perform operations. For example, instructions could be instructions for receiving/transmitting incentivized media files or blockchain files, for projecting images at image monitor 160, or for generating sound waves at loudspeaker 172. The memory devices 214 may also include data, such as identification data corresponding to the individual primary consumer appliance 210, stored blockchain files, stored media files, etc., that can be retrieved, manipulated, created, or stored by processor 212.

Controller 170 includes a network interface 216 such that primary consumer appliance 210 can connect to and communicate over one or more networks (e.g., network 250) with one or more network nodes. Network interface 216 can be an onboard component of controller 170 or it can be a separate, off board component. Controller 170 can also include one or more transmitting, receiving, or transceiving components for transmitting/receiving communications with other devices communicatively coupled across network 250. Additionally or alternatively, one or more transmitting, receiving, or transceiving components can be located off board controller 170.

Network 250 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 250 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 220, such as a web server, is in operative communication with primary consumer appliance 210. The remote server 220 can be used to host an information database (e.g., incentivized media files, blockchain files, payment data files, etc.). The server can be implemented using any suitable computing device(s). The remote server 220 may include one or more processors 222 and one or more memory devices 224 (i.e., memory). The one or more processors 222 can be any suitable processing device (e.g., a processor core, a microprocessor, an ASIC, a FPGA, a microcontroller, etc.) and can be one processor or a plurality of processors that are operatively connected. The memory device 224 can include one or more non-transitory computer-readable storage mediums, such as RAM, ROM, EEPROM, EPROM, flash memory devices, magnetic disks, etc., and combinations thereof. The memory devices 224 can store data and instructions which are executed by the processor 222 to cause remote server 220 to perform operations. For example, instructions could be instructions could be instructions for receiving/transmitting incentivized media files or blockchain files.

The memory devices 224 may also include data, such as social media data, image data, etc., that can be retrieved, manipulated, created, or stored by processor 222. The data can be stored in one or more databases. The one or more databases can be connected to remote server 220 by a high bandwidth LAN or WAN, or can also be connected to remote server 220 through network 250. The one or more databases can be split up so that they are located in multiple locales.

Remote server 220 includes a network interface 226 such that remote server 220 can connect to and communicate over one or more networks (e.g., network 250) with one or more network nodes. Network interface 226 can be an onboard component or it can be a separate, off board component. In turn, remote server 220 can exchange data with one or more nodes over the network 250. In particular, remote server 220 can exchange data with primary consumer appliance 210. Although not pictured, it is understood that remote server 220 may further exchange data with any number of client devices over the network 250. The client devices can be any suitable type of computing device, such as a general purpose computer, special purpose computer, laptop, desktop, integrated circuit, mobile device, smartphone, tablet, or other suitable computing device. In some embodiments, blockchain files such as discrete blocks, may be exchanged between multiple consumer appliances (e.g., consumer appliances 210, 230).

In certain embodiments, primary consumer appliance 210 is in operable communication with one or more secondary consumer appliances 230 via network 250. For example, the primary consumer appliance 210 and one or more secondary consumer appliances 230 may be organized into peer-to-peer communication. In turn, controller 170 of primary consumer appliance 210 may exchange signals (e.g., relating to blockchain files) with secondary consumer appliance 230. Together, the primary consumer appliance 210 and one or more secondary consumer appliances 230 can form an appliance network wirelessly connected to network 250 (e.g., separate from remote server 220). In optional embodiments, the appliance network is blockchain network such that discrete blocks can be exchanged across the appliance network and duplicated on multiple consumer appliances (e.g., primary consumer appliance 210 and secondary appliances 230 as part of a blockchain ledger).

The one or more secondary consumer appliances 230 may be of the same type of appliance as the primary consumer appliance 210 or, alternatively, as a different type of appliance. As an example, the primary consumer appliance 210 and secondary consumer appliances 230 may both be provided as a refrigerator appliance. As an alternative example, the primary consumer appliance 210 may be provided as a refrigerator appliance while the secondary consumer appliance 230 is provided as an oven appliance (or another suitable appliance), as would be understood.

As illustrated, secondary consumer appliance 230 may include a controller 270 operably coupled to one or more user inputs 264, image monitor 260, or loudspeaker 272. Controller 270 may include one or more processors 232 and one or more memory devices 234 (i.e., memory). The one or more processors 232 can be any suitable processing device (e.g., a processor core, a microprocessor, an ASIC, a FPGA, a microcontroller, etc.) and can be one processor or a plurality of processors that are operatively connected. The memory device 234 can include one or more non-transitory computer-readable storage mediums, such as RAM, ROM, EEPROM, EPROM, flash memory devices, magnetic disks, etc., and combinations thereof. The memory devices 234 can store data and instructions that are executed by the processor 232 to cause the secondary consumer appliance 230 to perform operations. For example, instructions could be instructions for receiving/transmitting incentivized media files or blockchain files, for projecting images at image monitor 260, or for generating sound waves at loudspeaker 272. The memory devices 234 may also include data, such as such as identification data corresponding to the individual secondary consumer appliance 230, stored blockchain files, stored media files, etc., that can be retrieved, manipulated, created, or stored by processor 232.

Controller 270 includes a network interface 236 such that secondary consumer appliance 230 can connect to and communicate over one or more networks (e.g., network 250) with one or more network nodes. Network interface 236 can be an onboard component of controller 270 or it can be a separate, off board component. Controller 270 can also include one or more transmitting, receiving, or transceiving components for transmitting/receiving communications with other devices communicatively coupled across network 250. Additionally or alternatively, one or more transmitting, receiving, or transceiving components can be located off board controller 270.

Figure 3:
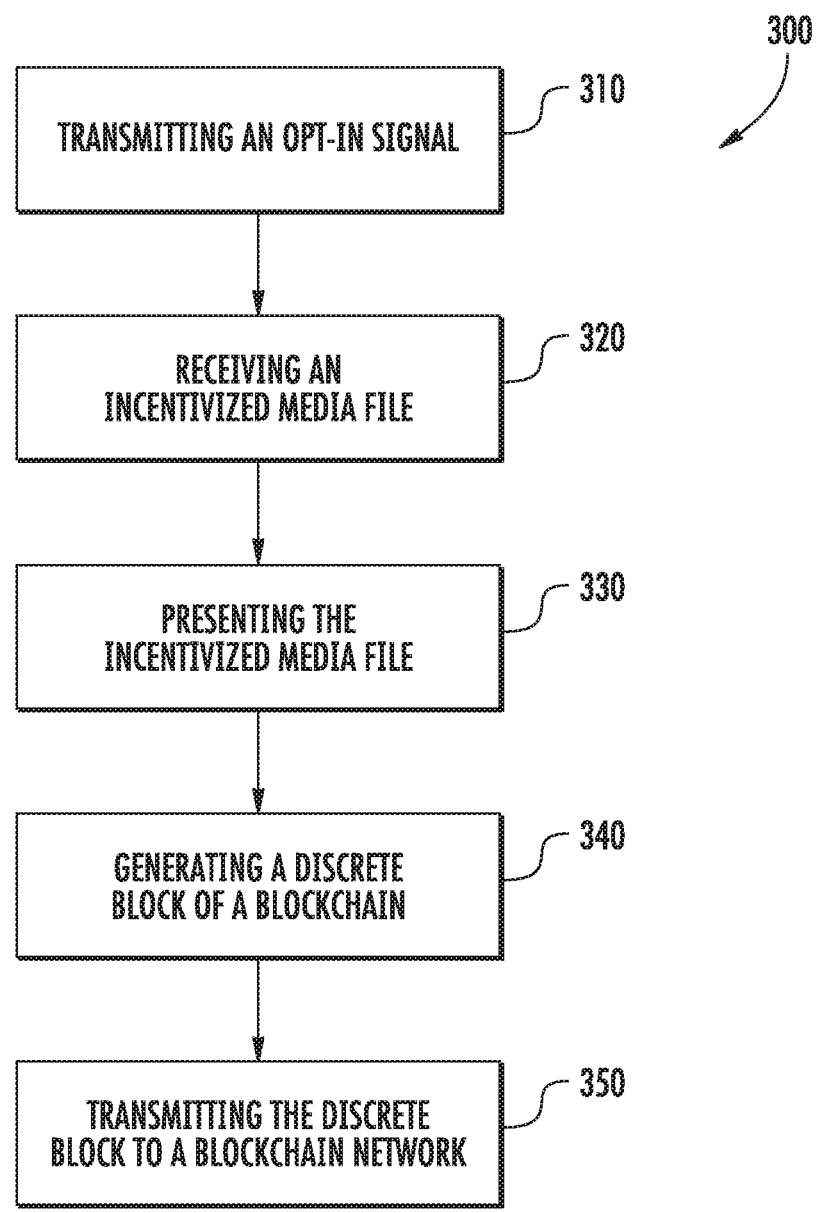
FIG. 3 provides a flow chart illustrating a method of operating a consumer appliance within a system according to exemplary embodiments of the present disclosure.

Referring now to FIG. 3, various methods may be provided for use with system 200 in accordance with the present disclosure. In general, the various steps of methods as disclosed herein may, in exemplary embodiments, be performed by the controller 170 part of an operation that the controller 170 is configured to initiate. During such methods, controller 170 may receive inputs and transmit outputs from various other components of the system 200. For example, controller 170 may send signals to and receive signals from remote server 220 or one or more secondary consumer appliances 230 (e.g., as part of a wireless peer-to-peer communications network). In particular, the present disclosure is further directed to methods, as indicated by 300, for operating a consumer appliance (e.g., primary consumer appliance 210—FIG. 2). Such methods advantageously provide an accurate and secure arrangement for assessing when and where an incentivized media file is presented and to whom a payment is owed.

At 310, the method 300 includes transmitting an opt-in signal from the consumer appliance. In some embodiments, presentation of an incentivized media file (e.g., advertisement) is contingent upon an opt-in signal being transmitted from the consumer appliance and received by a remote server that is, for example, in operative communication with the consumer appliance through a network, as described above. In some such embodiments, the opt-in signal is only transmitted from the consumer appliance after an opt-in input is received at the consumer appliance. The opt-in input may require a user to select a specific button of the user interface, prompt generated at a graphical user interface, or another suitable form of input. Advantageously, the method may ensure that a user has approved the presentation of incentivized media files or advertisements on the consumer appliance.

At 320, the method 300 includes receiving an incentivized media file. In certain embodiments, the incentivized media file includes a visual advertisement (e.g., text, one or more static images, video, etc.). Additionally or alternatively, the incentivized media file may include an audio advertisement (e.g., synced with corresponding video or, alternatively, provided in isolation). The incentivized media file may be stored locally on the consumer appliance or may be stored remotely and temporarily streamed to the consumer appliance. Optionally, the incentivized media file may be received from a remote server in wireless communication with consumer appliance, as described above.

At 330, the method 300 includes presenting the incentivized media file on the consumer appliance. For example, presentation of the incentivized media file may include projecting a visual advertisement on an image monitor of the consumer appliance, as described above. Additionally or alternatively, an audio file may be used to generate or more corresponding soundwaves from loudspeaker. In certain embodiments, the visual advertisement is projected from only a predetermined subportion area within the total viewable area of the display surface, as described above. Advantageously, the limited area in which the visual advertisement is permitted may permit continued, and otherwise typical, use of the image monitor (e.g., a graphical user interface that occupies the remaining portion of the total viewable area).

In certain embodiments, 330 includes first verifying power to the image monitor prior to presenting the incentivized media file. In other words, before the visual advertisement is presented at the image monitor, the consumer appliance may ensure that a voltage or current is being received at the image monitor. In some such embodiments, presentation of the incentivized media file is conditioned on or contingent upon verifying power to the image monitor. Advantageously, attempts made to subvert or avoid presentation of the incentivized media file may be discouraged.

At 340, the method 300 includes generating a discrete block of a blockchain. For instance, as is understood, each block of the blockchain can contain a hash of a previous block, a timestamp, and use specific data or content. In some embodiments, the use specific content includes media identification data (e.g., data that identifies what incentivized media has been presented, the duration of the presentation, the source of the incentivized media file, etc.). Additionally or alternatively, the use specific content may include appliance identifying data, such that the specific consumer appliance or user that received the incentivized media file of 330 is recorded. Advantageously, an accurate and secure record may be generated of what incentivized media file has been presented and to whom the file has been presented.

At 350, the method 300 includes transmitting the discrete block to a blockchain network wirelessly connected to the consumer appliance. Thus, the discrete block of 340 may be duplicated across the blockchain network. As described above, blockchain network may include a plurality of consumer appliances organized in peer-to-peer communication (e.g., as a wireless peer-to-peer network). In optional embodiments, the remote server is separated from the blockchain network, and thus is not required to store a duplicate copy of the corresponding blockchain.

In some embodiments, indication of payments owed or to be made may be provided as part of method 300. For instance, method 300 may include receiving a payment signal (e.g., third-party digital wallet payment, direct payment to a user's bank account, etc.) in response to transmitting the discrete block from the consumer appliance. Advantageously, payments may incentivize users to allow and engage with incentivized media files present at the consumer appliance. Moreover, users may be securely and equitably reimbursed for their attention and feedback.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance comprising a cabinet and an image monitor mounted to the cabinet, the method comprising:

receiving an opt-in input at the refrigerator appliance;

transmitting an opt-in signal from the consumer appliance in response to receiving the opt-in input;

receiving, subsequent to transmitting the opt-in signal, an incentivized media file from a remote server in wireless communication with the refrigerator appliance, the incentivized media file comprising a visual advertisement;

verifying power to the image monitor by detecting a voltage to the image monitor following receiving the incentivized media file;

presenting the incentivized media file on the refrigerator appliance, presenting the incentivized media file comprising projecting the visual advertisement on the image monitor, presenting the incentivized media file being conditioned on verifying power to the image monitor to ensure avoidance of the incentivized media file is discouraged;

generating a discrete block of a blockchain in response to presenting the incentivized media file;

transmitting the discrete block to a blockchain network wirelessly connected to the refrigerator appliance, the blockchain network comprising a plurality of consumer appliances organized in peer-to-peer communication; and receiving, in response to transmitting the discrete block, a payment signal for a payment to a user viewing the visual advertisement on the image monitor.

2. The method of claim 1, wherein the image monitor comprises a display surface defining a total viewable area and a predetermined sub-portion area within the total viewable area, and wherein projecting the visual advertisement on the display comprises limiting the visual advertisement to the predetermined sub-portion area of the display surface of the image monitor.

3. The method of claim 1, further comprising:
receiving a payment signal in response to transmitting the discrete block.

4. The method of claim 1, wherein the discrete block comprises a timestamp and media identification data.

5. The method of claim 1, wherein the remote server is separated from the blockchain network.

6. The method of claim 1, wherein the appliance is a refrigerator appliance.

* * * * *